(12) United States Patent
Guillaume et al.

(10) Patent No.: US 7,513,990 B2
(45) Date of Patent: Apr. 7, 2009

(54) PROCESS FOR SULFURIZATION OF CATALYSTS FOR HYDROTREATMENT

(75) Inventors: Denis Guillaume, Chemin de Collonges (FR); Sylvie Lopez, Lyons (FR); Tivadar Cseri, Saint Chamond (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 594 days.

(21) Appl. No.: 11/220,987

(22) Filed: Sep. 8, 2005

(65) Prior Publication Data

US 2006/0060500 A1 Mar. 23, 2006

(30) Foreign Application Priority Data

Sep. 8, 2004 (FR) .................................. 04 09544

(51) Int. Cl.
  *C10G 45/04* (2006.01)
  *B01J 27/02* (2006.01)
  *B01J 27/04* (2006.01)
(52) U.S. Cl. ...................... 208/213; 502/216
(58) Field of Classification Search ................ 208/108, 208/177, 208 R, 209, 213, 251 R, 251 H, 208/254 R, 254 H, 299; 502/216
See application file for complete search history.

(56) References Cited

U.S. PATENT DOCUMENTS 3,016,346 A 1/1962 O'Hara 6,417,134 B1 7/2002 Dufresne et al.

FOREIGN PATENT DOCUMENTS

EP 0 993 868 A 4/2000
GB 1 401 620 A 7/1975

*Primary Examiner*—Glenn Caldarola
*Assistant Examiner*—Randy Boyer
(74) *Attorney, Agent, or Firm*—Millen, White, Zelano & Branigan, P.C.

(57) ABSTRACT

The invention relates to a process for sulfurization of catalysts for hydrotreatment, in particular the catalysts for hydrotreating refractory oxides by sulfurization, in which said catalysts are subjected to a sulfurization stage under a gas atmosphere that contains hydrogen sulfide ($H_2S$), hydrogen ($H_2$), and optionally a cover gas for dilution and in which the $H_2S/H_2$ molar ratio is more than 4 and the $H_2S$ partial pressure is at least equal to 1 kPa.

Said sulfurization stage can be carried out in the hydrotreatment unit (sulfurization in situ) or, prior to the charging of the catalyst, in the hydrotreatment unit (sulfurization ex situ) and is generally carried out at a temperature of less than 600° C., preferably less than 500° C.

The invention also relates to the catalysts that are sulfurized by said sulfurization process and their use for hydrorefining and/or hydroconversion/hydrocracking of hydrocarbon feedstocks.

26 Claims, No Drawings

PROCESS FOR SULFURIZATION OF CATALYSTS FOR HYDROTREATMENT

FIELD OF THE INVENTION

The invention relates to a process for sulfurization of catalysts for hydrotreatment, in particular the catalysts for hydrotreating refractory oxides by sulfurization.

The invention also relates to the catalysts that are sulfurized by said sulfurization process.

The invention also relates to the use of the catalyst that is obtained by said process for sulfurization for the hydrorefining and/or hydroconversion/hydrocracking of hydrocarbon feedstocks.

PRIOR ART

The hydrorefining of hydrocarbon feedstocks such as the sulfur-containing petroleum fractions takes on increasingly high importance in the practice of refining with the growing necessity of reducing the amount of sulfur that is present in the petroleum products and converting heavy fractions into lighter fractions that can be upgraded as fuels. This situation stems from, on the one hand, the economic importance of optimally upgrading increasingly rich imported crude oils to heavy fractions that are low in hydrogen and rich in heteroatoms, including nitrogen and sulfur, and, on the other hand, the specifications that are imposed in various countries for commercial fuels.

The current catalytic hydrorefining processes use catalysts that can promote the main reactions that are useful to the implementation of these fractions, in particular the hydrogenation of aromatic cores (HAR), hydrodesulfurization (HDS), hydrodenitrating (HDN) and other hydroeliminations. The hydrorefining is used to treat feedstocks such as gasolines, gas oils, vacuum gas oils, atmospheric residues or vacuum residues, and residues that may or may not be deasphalted. It is equally indicated for the pretreatment of feedstocks of the cracking and catalytic hydrocracking processes. At least one hydrorefining stage is usually integrated into each of the known diagrams for upgrading petroleum fractions.

The catalysts that are used in these processes generally comprise at least one metal of group VIB (column 6 of the new notation of the periodic table) and/or at least one metal of group VIII (columns 8, 9 and 10 of the new notation of the periodic table). The most common formulations are of cobalt-molybdenum (CoMo), nickel-molybdenum (NiMo) and nickel-tungsten (Ni—W) type. These catalysts can come in the supported state or in bulk form. In the supported state, the porous matrix is generally an amorphous or poorly crystallized oxide (alumina, silica-alumina, etc.) that is optionally combined with a zeolitic or non-zeolitic molecular sieve.

The active and stable form of these hydrotreating catalysts beingthe sulfurized form when they come in oxide form after preparation, these catalysts are to undergo sulfurization. The sulfurization can be carried out in the hydrotreatment unit itself (the process is then referred to as sulfurization in situ) or prior to the charging of catalyst in the unit (the process is then referred to as "sulfurizationex situ"). The sulfurization can also be carried out in two stages: an activation stage or a presulfurization stage followed by a stage for complete sulfurization of the catalyst in the unit. The activation or pre-sulfurization stage can be carried out ex situ or in situ (in the hydrotreatment unit) based on the nature of the operation.

These different sulfurizations involve compounds that contain sulfur and that can provide hydrogen sulfide ($H_2S$); the hydrogen sulfide is actually the sulfurizing agent of these catalysts.

The procedures for sulfurization in situ are carried out in the pressurized hydrogen unit most often with liquid feedstocks that contain more or less sulfur and that are obtained from the distillation of crude oil, whereby in principle said feedstocks contain neither olefinic compounds nor diolefinic compounds. The process is then referred to as wet sulfurization in situ.

The sulfurization in situ under pressurized hydrogen can also be carried out directly with $H_2S$. The process is then referred to as dry sulfurization in situ. One of the main advantages of using a liquid phase is that the rise in temperature due to the exothermicity of the sulfurization reaction remains very low because the calories that are produced are easily eliminated by the liquid phase. In the case of a dry sulfurization in situ, the exothermicity of the reaction will then be higher since the calories will no longer be eliminated by the liquid phase.

Among the wet sulfurizations in situ, sulfurizations with or without "spiking agents" are found. The "spiking agents" are sulfur-containing compounds that are soluble in the liquid feedstocks that make it possible to produce hydrogen sulfide at lower temperatures than the sulfur-containing compounds initially contained in the liquid feedstocks, thus limiting the reactions for reduction of metal oxides at low temperature (the reduced metallic oxides actually being more difficult to sulfurize than the unreduced metal oxides). The sulfurizations without an additional sulfurizing agent (nonspiked feedstock) generally provide less active sulfurized catalysts, as H. Hallie shows in Oil and Gas Journal, Dec. 20, 1982, pp. 69-74. Industrially, the preferred additional sulfurizing agent is DMDS for economic reasons, for safety reasons (low volatility, low inflammability, moderate toxicity) and for reasons of efficiency (agent with a high sulfur content). The other compounds that contain sulfur that can be used as additional sulfurizing agents are selected from the group that is formed by the polysulfides and, for example, the organic polysulfides, the mercaptans, the sulfides, the disulfides, the elementary sulfur that is dissolved and/or partially in suspension.

For this type of sulfurization in situ, document FR 2 778 347 A1 recommends, to improve the performance levels of the catalysts in terms of activity and stability, injecting at least 130% of the sulfur stoichiometry that is necessary to the complete sulfurization of the catalyst before the catalyst reaches the final sulfurization temperature (generally less than 380° C. to limit the coking reactions) by preferably adhering to the condition that at least 50% of the sulfur stoichiometry that is necessary to the complete sulfurization of the catalyst be incorporated before the temperature reaches 250° C. in accordance with FR 2 755 379 A1.

According to U.S. Pat. No. 6,325,920 B1, in the case of a wet sulfurization in situ with an additional sulfurization agent ("spiking agent"), the presence of a dialkyl orthophthalate additive at a rate of 0.02 to 5% by weight relative to the additional sulfurizing agent makes it possible to obtain more active sulfurized catalysts.

Finally, the addition of a nitrogen-containing compound in the sulfurization feedstock is recommended by FR 2 778 346 A1 for the sulfurization of hydroconversion catalysts that contain at least one metal of group VIII (columns 8, 9 and 10 of the new notation of the periodic table) and at least one acid element. The monitoring of the activity of the acid sites of this type of catalyst that is obtained by carrying out a passivation of a portion of these sites by adding a nitrogen-containing compound during the sulfurization prevents a mis-timed cracking of the feedstock to be treated on these sites.

The procedures of sulfurizations ex situ, which consist in sulfurizing the catalyst beyond the hydrotreatment reactor, make it possible for refiners to eliminate a time-consuming stage of sulfurization in situ. The other advantage of sulfurizations ex situ is the direct supply to the user of an already active catalyst whose catalytic activity can be characterized before charging in the reactor. This type of sulfurization thus eliminates any risk of obtaining a non-optimal catalytic activity in the reactor.

These sulfurizations ex situ are characterized by a final passivation stage. Actually, the sulfide phases exhibit a very high reactivity with regard to the ambient air (nature of its being self-heated by oxidation) that prevents their subsequent manipulation without an additional treatment that is intended to limit this reactivity. Among the procedures of commercial sulfurizations ex situ, the TOTSUCAT process of the Eurecat Company (EP 0 564 317 B1 and EP 0 707 890 B1) and the XpresS process of the TRICAT Company (U.S. Pat. No. 5,958,816) are cited.

The TOTSUCAT process consists of a process that comprises the incorporation into a catalyst and in a more or less large portion into the pores of this catalyst of a sulfurization agent that is selected from the group that consists of, in particular, elementary sulfur and organic polysulfides, whereby this incorporation is carried out in the presence of a white spirit-type solvent that contains part or all of an olefin-type component or an olefinic fraction, for example of vegetable oil type, or a similar component, whereby the process comprises a treatment with pure or dilute hydrogen between 150 and 700° C. of the catalyst, then an oxidizing passivation stage. This stage consists in carrying out a flushing of the catalyst by an oxidizing gas flow that contains oxygen. Document WO 2004/028691 A2 describes a passivation process in which the sulfurized catalyst is brought into contact, during a heat treatment at more than 50° C., with an oxidizing gas flow that contains at least 2 kPa of oxygen, whereby the gas flow can be dry or wet.

The XpresS process consists in sulfurizing the catalysts under an $H_2S/H_2/N_2$ gas atmosphere in an expanded-bed or fluidized-bed reactor. This expanded-bed technology limits the problems of raising the temperature linked to the exothermicity of the sulfurization reaction, thus making it possible to apply higher sulfurization temperatures than those used in a fixed-bed reactor. This technology also makes it possible to maximize the contacts between the reagents and the catalyst, thus promoting a better sulfurization. Finally, the $H_2S/H_2/N_2$ gas atmosphere makes it possible to obtain non-coked sulfurized catalysts. The sulfurization gas contains by volume 3 to 10% $H_2S$, 3 to 10% $H_2$ and 80 to 94% nitrogen or an $H_2S/H_2$ molar ratio that varies from 0.33 to 3.33. The passivation stage, which is also of oxidizing type, is carried out by flushing with air that is diluted in nitrogen, such that the volumetric concentration of oxygen is between 0.25 and 21%, preferably between 0.25 and 2.5%.

The two-stage sulfurization processes comprise an activation or presulfurization stage that is followed by a complete sulfurization stage of the catalyst in the hydrotreatment unit. The activation or presulfurization stage can be carried out ex situ or in the hydrotreatment unit based on the nature of the operation.

Within this framework, the WO 02/066161 A1 document claims a process for sulfurization in situ of a hydrotreatment catalyst that comprises a stage for catalyst treatment with a tertiary mercaptan (tert-dodecyl mercaptan) in the absence of hydrogen, followed in the same reactor by a treatment stage with another sulfurization agent (DMDS type) in the presence of hydrogen. It was found that this two-stage sulfurization made it possible to obtain significantly more active catalysts than those sulfurized with DMDS alone.

Document U.S. Pat. No. 6,316,382 B1 claims a sulfurization process that is characterized in that a stage of prior reduction is initiated with at least one reducing gas other than the hydrogen before initiating the sulfurization stage. This type of process is particularly suitable for catalysts that contain at least one element that is selected from among the group IIIB, including the lanthanides and the actinides (column 3 of the new notation of the periodic table), group IVB (column 4 of the new notation of the periodic table), group VB (column 5 of the new notation of the periodic table), for which the traditional sulfurization methods are virtually ineffective. The sulfurization of this type of catalyst, reduced in a moderate way by a reducing gas other than hydrogen, makes it possible to obtain a better sulfurization and a better dispersion of the active phase.

The ACTICAT presulfurization process of the CR1 Company (U.S. Pat. Nos. 5,688,736 and 5,468,372) and the SULFICAT process of the EURECAT Company (EP 0 130 850 B1 and U.S. Pat. No. 4,530,917) are also part of this process category.

The ACTICAT process is characterized in that it comprises a stage for incorporating elementary sulfur into the pores of the catalyst at the melting point of the sulfur followed by a heat treatment under inert between 200 and 325° C. in the presence of a liquid olefinic hydrocarbon. The thus presulfurized catalysts are charged in the hydrotreatment units and are sulfurized under hydrogen during the rise in temperature under an actual feedstock. The metal oxides and the hydrogen react with the incorporated sulfur, thus producing hydrogen sulfide, water and metal sulfides. According to document WO 02/32572 A2, this process is preferred for sulfurizing the non-calcined oxide catalysts with a volatile fraction.

The SULFICAT process consists in incorporating sulfur into the pores of the catalyst in the absence of hydrogen and, starting from a polysulfide, di-tert-dodecyl polysulfide (TPS 32) or di-tert-nonyl polysulfide (TPS 37) that is dissolved in a suitable white-spirit-type solvent, whereby this incorporation is preferably done at ambient temperature. In a second stage, carried out in situ, an activation stage is initiated in the presence of hydrogen. As for the ACTICAT process, the sulfurization agent that is introduced into the catalyst in a predetermined amount gives rise under hydrogen to hydrogen sulfide, which will lead to the desired sulfide or sulfides of the metal or metals present in the catalyst.

The problem posed to one skilled in the art is obtaining very well sulfurized catalysts so as to maximize their catalytic performance levels in terms of activity and stability. The sulfurized nature is evaluated by the sulfurization level, which is defined as the ratio between the molar ratios of experimental S/(metals) and theoretical S/(metals), multiplied by 100, the theoretical ratio that corresponds to the total transformation of the metal oxides into sulfides. A catalyst is considered to be well sulfurized when its sulfurization level is more than 90%, preferably more than 95%, and even more preferably equal to 100%.

This total or nearly total sulfurization level is especially difficult to attain since the oxide phases that are precursors of the active phase are refractory by sulfurization.

The refractory nature can be linked to the presence of high contents of oxide phase (supported catalysts or bulk catalysts) and/or to the nature of oxide phases that are precursors of active phases and/or to the presence of undesired crystallized oxide phases and/or to the presence of dopants and/or to the nature of the substrate in the case of supported catalysts. The traditional sulfurization methods (sulfurization in liquid phase under pressurized hydrogen by a mixture of a hydrocarbon feedstock and a sulfur-containing compound such as DMDS or sulfurization under an $H_2S$—$H_2$ gas mixture with a low molar ratio ($H_2S/H_2$) are ineffective for obtaining a total sulfurization level of refractory catalysts.

It has now been discovered, surprisingly enough, that the refractory catalysts can be very well sulfurized, without even prior activation, under a gas atmosphere that contains hydrogen sulfide and hydrogen provided that they have an $H_2S/H_2$ molar ratio of more than 4, preferably more than 7, and an $H_2S$ partial pressure that is at least equal to 1 kPa. Without wanting to be linked by any theory, the sulfurization conditions discovered by the applicant would make it possible to limit the reduction reactions of metal oxides by hydrogen, which are for the sulfurization of refractory oxides.

DESCRIPTION OF THE INVENTION

Description of the Sulfurization Process According to the Invention

The invention relates to a process for sulfurization of catalysts, in particular the refractory hydrotreatment catalysts, which comprises a sulfurization stage under a gas atmosphere that contains hydrogen sulfide ($H_2S$), hydrogen ($H_2$) and optionally a cover gas for dilution and in which the $H_2S/H_2$ molar ratio is more than 4, preferably more than 7, and the $H_2S$ partial pressure is at least equal to 1 kPa.

According to a preferred mode of this invention, the dilution by a cover gas of the sulfurization atmosphere (preferably nitrogen) is carried out to limit the temperature rises linked to the exothermicity of the sulfurization reactions.

The sulfurization stage can be carried out in situ or ex situ.

Said sulfurization stage is generally carried out at a temperature that is more than the temperature for injecting sulfurizing gas (generally less than 200° C.) and less than 600° C., preferably less than 500° C.

The $H_2S/H_2$ molar ratio is preferably less than 20 and more preferably less than 10.

Embodiment in situ

In the embodiment in situ, the hydrogen sulfide can be obtained from units for washing gases with amines that are present in the refinery to purify the gases obtained from units for hydrotreatment, thermal cracking, catalytic cracking and hydrocracking.

In the embodiment in situ, after charging, the hydrotreatment unit is purged by a cover gas (preferably nitrogen) then by hydrogen, and it is then pressurized up to the nominal process pressure or up to the minimum pressure of operation of the recycling compressor. The total pressure does not influence the refractory oxides' capability of being sulfurized, whereby the main parameters are the $H_2S/H_2$ molar ratio that should be more than 4, preferably more than 7, and the $H_2S$ partial pressure that should be at least equal to 1 kPa. The catalytic bed is then generally heated under hydrogen up to a temperature of less than 200° C., preferably less than 180° C. The $H_2S$ that is pure or mixed with a cover gas (preferably nitrogen) is then injected. The injection temperature of the sulfurizing gas is generally less than 200° C. The preferred temperature zone for the injection of $H_2S$ that is pure or mixed with a cover gas (preferably nitrogen) is 80 to 180° C.

The total gas flow rate of $H_2S$—$H_2$ or $H_2S$—$H_2$-cover gas that is calculated relative to the volume of charged catalyst is between 1 and 10,000 liters of gas per liter of catalyst, measured under normal temperature and pressure conditions, and preferably between 5 and 5000 liters of gas per liter of catalyst.

The final sulfurization temperature is generally more than 300° C. and less than 600° C., and preferably less than 500° C. A final sulfurization temperature of between 300 and 380° C. will again be preferred. The duration of the stage at the final sulfurization temperature is generally several hours (less than 24 hours).

The increase in temperature between the injection temperature of the sulfurizing gas and the final temperature is carried out by means known to one skilled in the art at a rhythm that is compatible with the good mechanical behavior and the elimination of constraints produced by the expansion of various parts of the installation. By way of indication, the rise in temperature is generally on the order of 1 to 25° C. per hour. This rise in temperature can be carried out either right up to the final temperature stage or in one or more intermediate stages.

An intermediate stage at a temperature of between 210 and 250° C. is preferred before the rise in temperature to the final sulfurization temperature.

After the sulfurization stage, the temperature is lowered to a temperature of less than 300° C., preferably less than 250° C. After this cooling, the intake of $H_2S$ or mixing with a cover gas (preferably nitrogen) is halted. The unit is, if necessary, brought to the process pressure and is ready to be charged.

Preferably, in its mode in situ, the sulfurization process of this invention comprises the following stages:

Purging the hydrotreatment unit after charging by a cover gas (preferably nitrogen), then by hydrogen, and pressurization of the unit up to the nominal pressure of the hydrotreatment process or up to the minimum pressure of operation of the recycling compressor;

Heating under hydrogen of the catalytic bed up to a temperature of less than 200° C.;

Sulfurization stage:

Injection of $H_2S$ that is pure or mixed with a cover gas (preferably nitrogen) with a total gas flow rate of $H_2S$—$H_2$ or $H_2S$—$H_2$-cover gas that is calculated relative to the volume of charged catalyst between 1 and 10,000 liters of gas per liter of catalyst, measured under normal temperature and pressure conditions, and with a sulfurizing gas injection temperature of less than 200° C.;

Rise in temperature up to a final sulfurization temperature of more than 300° C. and less than 600° C., right up to the final sulfurization stage or in one or more stages;

Stage at the final sulfurization temperature for a duration of less than 24 hours;

Cooling of the unit under sulfurizing atmosphere up to a temperature of less than 300° C.;

Halting of the intake of $H_2S$ that is pure or mixed with a cover gas (preferably nitrogen) and, if necessary, bringing the unit to the pressure of the hydrotreatment process.

According to a variant of this mode, an intermediate stage at a temperature of between 210 and 250° C. is preferred before the rise in temperature to the final sulfurization temperature.

According to another variant of this mode, a final sulfurization temperature between 300 and 380° C. will again be more preferred

Embodiment ex situ

In the embodiment ex situ, the sulfurization stage is followed by an oxidizing passivation stage under a gas flow, containing at most 21.3 kPa of oxygen, at a temperature of preferably less than 150° C.

The fixed-bed, fluidized-bed or moving-bed technologies can be used.

In the embodiment ex situ of the process according to the invention, the conditions of temperature, pressure, and flow rate of the sulfurization stage can be essentially the same as the conditions in situ (preferred mode, in particular with the fixed-bed technology), but they can be different, in particular regarding the flow rates. Furthermore, a final passivation stage is required.

After the cooling stage under $H_2S$—$H_2$ or $H_2S$—$H_2$-cover gas (preferably nitrogen) up to a temperature of less than 300° C., preferably less than 250° C., the catalyst is cooled under $H_2$ to a temperature of less than 150° C., preferably to a temperature of between 50 and 100° C. At this temperature, the unit is then purged under cover gas (preferably nitrogen) for several hours (generally less than 24 hours) to eliminate $H_2S$ and $H_2$. The catalyst is then treated under an oxidizing gas flow that contains a partial pressure of oxygen that can reach 21.3 kPa.

At the maximum partial pressure of oxygen attained, the unit is cooled to the ambient temperature, depressurized, if necessary, and the catalyst is unloaded in ambient air without any risk of self-heating.

Preferably, the sulfurization process in its mode ex situ comprises the following stages:

Purging of the sulfurization unit after charging by a cover gas (preferably nitrogen) then by hydrogen and pressurization of the unit, if necessary;

Heating under hydrogen of the catalytic bed to a temperature of less than 200° C.;

Sulfurization stage

Injection of $H_2S$ that is pure or mixed with a cover gas (preferably nitrogen) in the sulfurization unit with a total gas flow rate of $H_2H$—$H_2$ or $H_2S$—$H_2$-cover gas that is calculated relative to the volume of charged catalyst of between 1 and 10,000 liters of gas per liter of catalyst, measured under the normal temperature and pressure conditions at a temperature of injecting sulfurizing gas of less than 200° C.;

Rise in temperature to a final sulfurization temperature of more than 300° C. and less than 600° C., right up to the final sulfurization stage or in one or more stages;

Stage at the final sulfurization temperature for a duration of less than 24 hours;

Cooling of the unit under sulfurizing atmosphere to a temperature of less than 300° C.;

Cooling under $H_2$ of the unit to a temperature of less than 150° C.;

Purging under cover gas of the unit to a temperature of less than 150° C.;

Oxidizing passivation stage: treatment of the catalyst under an oxidizing gas flow that contains a partial pressure of oxygen of at most 21.3 kPa and at a temperature of less than 150° C. for a maximum period of 24 hours;

Cooling of the unit to the ambient temperature, depressurization if necessary and unloading of the catalyst in ambient air.

Very preferably, the partial pressure of oxygen is increased by 1 kPa to 21.3 kPa by a stage of 2 to 4 kPa. The stage changing is conditioned by the total disappearance of the exothermic effect and by the return to the temperature before introducing oxygen.

Characteristics of the Catalysts that can be Subjected to Sulfurization Treatment According to the Invention The hydrotreatment processes consist in treating, under pressurized hydrogen, a petroleum fraction with the assistance of a solid catalyst. The hydrotreatment catalysts, in particular the refractory catalysts that are covered by the invention, are characterized by the presence of high contents of active phase comprising at least one element of groups VIB and VIII (supported catalysts with high contents in the active phase or bulk catalysts) and optionally at least one element that is selected from among group IIIB, including the lanthanides and the actinides, group IVB and group VB and optionally by the presence of dopants selected from the group: P, B, Si and halogens (group VIIA) and optionally in the presence of crystallized oxide phases such as the phases $Al_2(MoO_4)$, $CoAl_2O_4$, $NiAl_2O_4$, $MoO_3$, $Co_3O_4$, $CoMoO_4$, $NiMoO_4$, etc., which can appear during the preparation and/or the regeneration of hydrotreating catalysts based on elements of groups VIB and VIII.

In % by weight relative to the total mass of the catalyst in the oxide state, these catalysts generally contain at least one metal that is selected from the following groups and with the following contents:

0.01 to 75%, preferably 0.01 to 50%, and even more preferably 0.01 to 40% of at least one metal that is selected from among the elements of groups IIIB, IVB, and VB, 0.01 to 75%, preferably 0.01 to 50%, and even more preferably 0.01 to 40% of at least one metal that is selected from among the elements of group VIB, 0 to 30%, preferably 0.01 to 25%, of at least one metal of group VIII, 0 to 99%, preferably 1 to 98%, of at least one substrate that is selected from the group that consists of the amorphous matrices and the poorly crystallized matrices, and optionally, 0 to 90%, preferably 0.01 to 85%, and even more preferably 0.01 to 80% of a molecular sieve that may or may not be zeolitic, 0 to 40%, preferably 0.01 to 30%, and even more preferably 0.01 to 20% of at least one element that is selected from the group that consists of boron, silicon and phosphorus, 0 to 20%, preferably 0.01 to 15%, and even more preferably 0.01 to 10%, of at least one element that is selected from the group VIIA.

The supported catalysts that are sulfurized by the process of this invention can be prepared by any method that is well known to one skilled in the art.

In general, the process for preparation of supported catalysts that are sulfurized by the process of this invention comprises the following stages:

a) A solution is formed that contains at least the following compounds: a solvent, at least one source of an element of groups VIII and VIB, and/or at least one source of an element of groups IIIB, including lanthanides and actinides, IVB and group VB, and optionally at least one source of an element that is selected from the group that is formed by the elements P, B, Si and halogens (group VIIA).

b) A matrix is wetted or impregnated by said solution, and said mixture is kept at a temperature of between the temperature encompassed between ambient temperature and 80° C. for several hours.

c) The wet solid that is obtained in stage b) is dried at a temperature of between 80° C. and 150° C., generally in air, and d) The dry solid that is obtained in stage c) is calcined at a temperature of more than 150° C., generally in air.

It is possible to initiate each of the preceding stages a) to d) several times, separately or combined with at least one other of preceding stages a) to d) as it is known to one skilled in the art. For example, it is possible to initiate the succession of stages b), c) and d) at least twice.

The impregnation of the matrix is preferably carried out by the so-called "dry" impregnation method that is well known to one skilled in the art.

The impregnation can be carried out in a single stage by a solution that contains all of the constituent elements of the final catalyst.

The elements that are selected from among group IIIB including the lanthanides and the actinides, group IVB, group VB, group VIB, and group VIII, like the element that is selected from the group that is formed by P, B and Si, and the element that is selected from among the anions of group VIIA, can be introduced by one or more ion exchange operations on the selected matrix, with the assistance of a solution that contains at least one transition metal or rare earth precursor salt.

The bulk catalysts (without substrate) that are sulfurized by the process of this invention can be prepared by any method that is well known to one skilled in the art. In a general way, the synthesis of bulk catalysts is initiated from solids comprising at least one element of groups VIB and VIII and/or at least one element that is selected from among the group IIIB including the lanthanides and the actinides, group IVB and group VB, and optionally in the presence of dopants selected from the group: P, B, Si and halogens (group VIIA), whereby said solids are obtained respectively from salts of selected elements, whereby said syntheses are carried out simultaneously or successively, the order not being very important, in the same physical space or separately: then initiating the mechanical mixing of said solids optionally with a matrix, and, finally, after a shaping, initiating a calcination of said mechanical mixing so as to obtain the catalyst.

The elements of group VB are selected from among vanadium, niobium, and thallium, and the elements of group IVB are selected from among titanium, zirconium, hafnium, and preferably titanium. The elements of group IIIB are selected from among yttrium, lanthanum, cerium, praseodymium, neodymium, samarium, europium, gadolinium, terbium, dysprosium, holmium, erbium, thulium, ytterbium, lutetium, actinium, thorium and uranium. The elements of group VIII are selected from among iron, cobalt, nickel, ruthenium, rhodium, palladium, osmium, iridium and platinum, preferably iron, cobalt, and nickel. The elements of group VIB are selected from among chromium, molybdenum and tungsten.

Among the compounds that contain at least one element whose atomic number is included in the unit consisting of the elements of group IIIB including the lanthanides and actinides, group IVB and group VB, groups VIB and VIII, it is possible to use the oxides, the hydroxides, the oxyhydroxides, the acids, the polyoxometallates, the alkoxides, the oxalates, the ammonium salts, the nitrates, the carbonates, the hydroxycarbonates, the carboxylates, the halides, the oxyhalides, the phosphates, the hydrides, and the thiosalts, in particular ammonium. The oxides and the salts of transition metals, lanthanides and actinides are preferably used.

The preferred phosphorus source is phosphoric acid $H_3PO_4$, but its salts and its esters, such as alkaline phosphates and ammonium phosphates, are also suitable. The phosphorus can be introduced, for example, in the form of a mixture of phosphoric acid and a basic organic compound that contains nitrogen, such as ammonia, primary and secondary amines, cyclic amines, the compounds of the pyridine family, the compounds of the quinoline family and the compounds of the pyrrole family.

Many sources of silicon can be used. Thus, it is possible to use a hydrogel, an aerogel or a colloidal suspension of silicon oxide, the oxides of precipitation, the oxides that are obtained from the hydrolysis of esters such as ethyl orthoslicate $Si(OEt)_4$, the silanes and polysilanes, the siloxanes and polysiloxanes, or the halide silicates such as ammonium fluorosilicate $(NH_4)_2SiF_6$ or sodium fluorosilicate $Na_2SiF_6$. The silicon can be added by, for example, impregnation of ethyl silicate in solution in an alcohol.

The boron source can be an amorphous borate, such as ammonium biborate or ammonium pentaborate. The boron can be introduced by, for example, a solution of boric acid in an alcohol.

The element sources of group VIIA that can be used are well known to one skilled in the art. For example, the fluoride anions can be introduced in the form of hydrofluoric acid or its salts. These salts are formed with alkaline metals, ammonium or an organic compound. In the latter case, the salt is advantageously formed in the reaction mixture by reaction between the organic compound and the hydrofluoric acid. It is also possible to use hydrolysable compounds that can release fluoride anions into the water, such as ammonium fluorosilicate $(NH_4)_2SiF_6$, silicon tetrafluoride $SiF_4$ or sodium tetrafluoride $Na_2SiF_6$. The fluorine can be introduced by, for example, impregnation of an aqueous solution of hydrofluoric acid or ammonium fluoride.

The chloride anions can be introduced in the form of hydrochloric acid or of these salts. These salts are formed with alkaline metals, ammonium or an organic compound. In the latter case, the salt is advantageously formed in the reaction mixture by reaction between the organic compound and the hydrochloric acid.

The usually amorphous or poorly crystallized porous mineral matrix is usually selected from the group that is formed by alumina, silica, silica-alumina, magnesia, clay, titanium oxide, zirconium oxide, lanthanum oxide, cerium oxide, aluminum phosphates, boron phosphates, or a mixture of at least two of the oxides cited below and the boron alumina-oxide combinations, the alumina-titanium, alumina-zirconia and titanium-zirconia mixtures. It is also possible to select the aluminates, and, for example, the aluminates of magnesium, calcium, barium, manganese, iron, cobalt, nickel, copper and zinc, the mixed aluminates and, for example, those containing at least two of the metals cited above. It is also possible to select the titanates, and, for example, the titanates of zinc, nickel and cobalt. Preferably, matrices that contain alumina are used, in all its forms that are known to one skilled in the art, for example gamma-alumina. It is also possible advantageously to use mixtures of alumina and silica and mixtures of alumina and boron oxide.

The matrix can also contain, in addition to at least one of the compounds cited above, at least one synthetic or natural simple clay of dioctahedral phyllosilicate 2:1 type or trioctahedral phyllosilicate 3:1 type, such as kaolinite, antigorite, chrysotile, montmorillonnite, beidellite, vermiculite, talc, hectorite, saponite, and laponite. These clays can optionally be delaminated. It is also possible advantageously to use mixtures of alumina and clay and mixtures of silica-alumina and clay.

The matrix can also contain, in addition to at least one of the compounds cited above, at least one compound that is selected from the group that is formed by the family of molecular sieves, such as crystallized aluminosilicate, synthetic zeolites and natural zeolites, such as the Y zeolite, the fluorinated Y zeolite, and the Y zeolite that contains rare earths, the X zeolite, the L zeolite, the beta zeolite, the small-pore mordenite, the large-pore mordenite, the omega zeolites, the NU-10, ZSM-22, NU-86, NU-87, and NU-88 zeolites, and the ZSM-5 zeolite. Among the zeolites, it is usually preferred to use zeolites whose silicon/aluminum (Si/Al) framework atom ratio is more than about 3:1. Zeolites with a faujasite structure and in particular Y zeolites that are stabilized and ultrastabilized (USY) are advantageously used either in the form at least partially exchanged with metallic cations, for example cations of alkaline-earth metals and/or cations of rare earth metals with atomic numbers dd 57 to 71 inclusive, or in hydrogen form (*Zéolite Molecular Sieves Structure*, Chemistry and Uses, D. W. BRECK, J. WILLEY and Sons 1973).

The acidic substrates also can be selected from the group that is formed by the family of non-zeolitic crystallized molecular sieves, such as the mesoporous silicas, silicalite, silicoaluminophosphates, aluminophosphates, ferrosilicates, titanium silicoaluminates, borosilicates, chromosilicates and aluminophosphates of transition metals (including cobalt).

The shaping of the matrix or bulk catalyst can be carried out by, for example, extrusion, pelletizing, by the oil-drop method, by turntable granulation or by any other method that is well known to one skilled in the art. The matrix or the preformed bulk catalyst is then usually calcined in air, usually at a temperature of at least 100° C., commonly from about 200 to 1000° C.

The sulfurization of the above-cited catalysts is carried out by the process according to the invention.

The above-cited hydrotreatment catalysts that are obtained by the process of this invention are used for the hydrorefining and/or hydroconversion/hydrocracking of hydrocarbon feedstocks such as the petroleum fractions, the fractions that are obtained from carbon or the hydrocarbons that are produced from natural gas. Said catalysts are more particularly used in reactions of hydrotreatment, hydrogenation, hydrodenitrating, hydrodeoxygenation, hydrodearomatization, hydrodesulfurization, hydrodemetallization, hydroisomerization, hydrodealkylation, and dehydrogenation. The above-cited catalysts that are sulfurized by the process of this invention are also advantageously used for the hydroconversion/hydrocracking of hydrocarbon feedstocks such as, for example, feedstocks that contain aromatic compounds and/or olefinic compounds and/or naphthenic compounds and/or paraffinic compounds, whereby said feedstocks optionally contain metals, and/or nitrogen, and/or oxygen and/or sulfur.

In these uses, the above-cited catalysts that are sulfurized by the process of this invention exhibit an improved activity relative to the prior art.

The feedstocks that are used in the various processes that use the above-cited catalysts that are sulfurized by the process of this invention are generally selected from the group that is formed by the gasolines, the gas oils, the vacuum gas oils, the residues that may or may not be deasphalted, the paraffinic oils, the waxes and paraffins. They contain at least one heteroatom such as sulfur, oxygen, nitrogen and optionally metals such as nickel and vanadium. The hydrorefining or hydroconverion conditions, such as temperature, pressure, one liter of hydrogen/one liter of hydrocarbon volumetric ratio, and hourly volumetric flow rate, can be very variable based on the nature of the feedstock, the quality of the desired products, and installations used by the refiner. The operating conditions that are used in the reactor or reactors of various processes using the above-cited catalysts that are sulfurized by the process of this invention are standard: a temperature of more than 200° C., preferably between 200 and 450° C., under a pressure of between 0.5 and 30 MPa, preferably less than 20 MPa, whereby the volumetric flow rate is between 0.1 and 10 $h^{-1}$, preferably between 0.1 and 8 $h^{-1}$, and very preferably between 0.2 and 6 $h^{-1}$, and the amount of hydrogen that is introduced is such that the one liter of hydrogen/one liter of hydrocarbon volumetric ratio is between 10 and 5000 l/l, preferably between 100 and 2000 l/l.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and, all parts and percentages are by weight, unless otherwise indicated.

EXAMPLES

The following examples explain the invention without limiting its scope.

An alumina-supported NiMoP catalyst with a high active phase content was prepared (Example 1). Samples of this catalyst were then sulfurized according to different procedures of sulfurization in situ (Examples 2, 3, 4, 5, 6) and ex situ (Example 7). The performance levels of these sulfurized samples were evaluated in a hydrodesulfurization pilot unit equipped with an isothermal fixed-bed reactor that is traversed with an upward flow (Example 8). The volume of charged catalyst is 40 $cm^3$ and is based on the packing density (DRT in $g/cm^3$) measured on the oxide catalyst.

The sulfurization levels of sulfurized samples under conditions according to the invention were compared to those of samples sulfurized under conditions not in accordance with the invention (Example 9).

Example 1

Preparation of an NiMoP Hydrotreating Catalyst in the Oxide State: Catalyst C1

A matrix that consists of ultrafine tabular boehmite or alumina gel, marketed under the name SB3 by the Condéa Chemie GmbH Company, was used. This gel was mixed with an aqueous solution that contains nitric acid at 66% (7% by weight of acid per gram of dry gel), then kneaded for 15 minutes. At the end of this kneading, the paste that is obtained is passed through a die that has cylindrical orifices with a diameter equal to 1.3 mm. The extrudates are then dried for one night at 120° C., then calcined at 550° C. for 2 hours in moist air that contains 7.5% by volume of water. Cylindrical extrudates with a 1.2 mm diameter and that have a specific surface area of 255 $m^2/g$, a pore volume of 0.60 $cm^3/g$ and a monomodal pore size distribution centered on 100 Å are thus obtained. The analysis of the matrix by X-ray diffraction reveals that the latter consists only of cubic gamma-alumina with low crystallinity.

Nickel, molybdenum and phosphorus are added to the alumina substrate that is described above and that comes in "extrudate" form. The salts of these three elements are introduced simultaneously by dry impregnation of the substrate. The nickel salt that is used is nickel carbonate, the precursor of molybdenum is molybdenum oxide $MoO_3$, and the phosphorus is introduced in the form of phosphoric acid $H_3PO_4$. The impregnation solution is prepared by dissolution at 90° C., molybdenum oxide, nickel carbonate, in the phosphoric acid solution that is diluted in water so as to obtain a solution volume that is equivalent to the pore volume of the alumina. After dry impregnation, the extrudates are allowed to mature in water-saturated atmosphere for 12 hours, then they are dried for one night at 120° C. and finally calcined at 500° C. for 2 hours in dry air. The final contents of metal oxides, the specific surface area of the catalyst (determined according to the BET method that is well known to one skilled in the art) and the packing density are then as follows:

| | |
|---|---|
| $MoO_3$: | 21% by weight |
| NiO: | 4.3% by weight |
| $P_2O_5$: | 5% by weight |
| Specific surface area (S BET): | 165 (m$^2$/g) |
| DRT (g/cm3): | 0.795 |

Example 2

$H_2S$—$H_2$ Sulfurization in situ at Atmospheric Pressure with an $H_2S/H_2$ Molar Ratio that is Equal to 1 (Catalyst C2 Not According to the Invention)

A sample of 40 cm3 of oxide catalyst (31.8 g) is sulfurized in the pilot unit at atmospheric pressure by a gas mixture with a composition of 50% by volume of hydrogen sulfide ($H_2S$) and 50% by volume of hydrogen, or an $H_2S/H_2$ molar ratio that is equal to 1. The sulfurization is carried out in two stages, whereby the first is a controlled temperature increase phase at 3° C./minute with an intermediate stage of 1 hour at 230° C., and the second is a 2-hour stage at the final sulfurization temperature of 350° C. During the first stage, $H_2S$ is injected at 100° C. The flow rate of the gas mixture is adjusted such that the amount of sulfur injected before the catalyst reaches the final sulfurization temperature corresponded to 130% of the sulfur stoichiometry that is necessary to the complete sulfurization of the catalyst. After sulfurization, the catalyst is cooled under the $H_2S$ (50%)-$H_2$ (50%) gas mixture to the ambient temperature. At ambient temperature, the unit is pressurized with pure hydrogen to the total pressure of the HDS test.

Example 3

$H_2S$—$H_2$ Sulfurization in situ at Atmospheric Pressure with an $H_2S/H_2$ Molar Ratio that is Equal to 9 (Catalyst C3 According to the Invention)

A sample of 40 cm$^3$ of oxide catalyst (31.8 g) is sulfurized in the pilot unit at atmospheric pressure by a gas mixture with a composition of 90% by volume of hydrogen sulfide ($H_2S$) and 10% by volume of hydrogen, or an $H_2S/H_2$ molar ratio that is equal to 9. The sulfurization is carried out in two stages, whereby the first is a controlled temperature increase phase at 3° C./minute with an intermediate stage of 1 hour at 230° C., and the second is a 2-hour stage at the final sulfurization temperature of 350° C. During the first stage, the $H_2S$ is injected at 100° C. The flow rate of the gas mixture is adjusted such that the amount of sulfur injected before the catalyst reaches the final sulfurization temperature corresponded to 130% of the sulfur stoichiometry that is necessary to the complete sulfurization of the catalyst. After sulfurization, the catalyst is cooled under the $H_2S$ (90%)-$H_2$ (10%) gas mixture to the ambient temperature. At ambient temperature, the unit is pressurized under pure hydrogen to the total pressure of the HDS test.

Example 4

$H_2S$—$H_2$—$N_2$ Sulfurization in situ at Atmospheric Pressure with an $H_2S/H_2$ Molar Ratio that is Equal to 9 (Catalyst C4 According to the Invention)

A sample of 40 cm$^3$ of oxide catalyst (31.8 g) is sulfurized in the pilot unit at atmospheric pressure by a gas mixture with a composition of 85% by volume of nitrogen 13.5% by volume of hydrogen sulfide ($H_2S$), and 1.5% by volume of hydrogen. Relative to Example 3, the partial pressures of $H_2S$ and $H_2$ are divided by a factor of 6.67, whereby the $H_2S/H_2$ molar ratio remains equal to 9.

The sulfurization is carried out in two stages, whereby the first is a controlled temperature increase phase at 3° C./minute with an intermediate stage of 1 hour at 230° C., and the second is a 2-hour stage at the final sulfurization temperature of 350° C. During the first stage, the $H_2S$ is injected at 100° C. The flow rate of the gas mixture as well as the temperature rise slope are adjusted such that the amount of sulfur injected before the catalyst reaches the final sulfurization temperature corresponded to 130% of the sulfur stoichiometery that is necessary to the complete sulfurization of the catalyst. After sulfurization, the catalyst is cooled under the $H_2S$ (13.5%)-$H_2$ (1.5%)-$N_2$ (85%) gas mixture to the ambient temperature. At ambient temperature, the unit is pressurized with pure hydrogen to the total pressure of the HDS test.

Example 5

$H_2S$—$H_2$ Sulfurization in situ under 2 MPa of Total Pressure with an $H_2S/H_2$ Molar Ratio that is Equal to 9 (Catalyst C5 According to the Invention)

A sample of 40 cm$^3$ of oxide catalyst (31.8 g) is sulfurized in the pilot unit under 2 MPa of total pressure by a gas mixture with a composition of 90% by volume of hydrogen sulfide ($H_2S$) and 10% by volume of hydrogen. Relative to Example 3, the $H_2S$ and $H_2$ partial pressures are multiplied by a factor of 20, whereby the $H_2S/H_2$ molar ratio remains equal to 9.

The sulfurization is carried out in two stages, whereby the first is a controlled temperature increase phase at 3° C./minute with an intermediate stage of 1 hour at 230° C., and the second is a 2-hour stage at the final sulfurization temperature of 350° C. During the first stage, the $H_2S$ is injected at 100° C.

The flow rate of the gas mixture as well as the temperature rise slope are adjusted such that the amount of sulfur injected before the catalyst reaches the final sulfurization temperature corresponded to 130% of the sulfur stoichiometry that is necessary for the complete sulfurization of the catalyst. After sulfurization, the catalyst is cooled under the $H_2S$ (90%)-$H_2$ (10%) gas mixture to the ambient temperature. At ambient temperature, the unit is pressurized with pure hydrogen to the total pressure of the HDS test.

Example 6

H$_2$S—H$_2$—N$_2$ Sulfurization in situ under 2 MPa of Total Pressure with an H$_2$S/H$_2$ Molar Ratio that is Equal to 9 (Catalyst C6 According to the Invention)

A sample of 40 cm$^3$ of oxide catalyst (31.8 g) is sulfurized in the pilot unit under 2 MPa of total pressure by a gas mixture with a composition of 85% by volume of nitrogen, 13.5% by volume of hydrogen sulfide (H$_2$S), and 1.5% by volume of hydrogen. Relative to Example 3, the H$_2$S and H$_2$ partial pressures are multiplied by a factor of 3, whereby the H$_2$S/H$_2$ molar ratio remains equal to 9.

The sulfurization is carried out in two stages, whereby the first is a controlled temperature increase phase at 3° C./minute with an intermediate stage of 1 hour at 230° C., and the second is a 2-hour stage at the final sulfurization temperature of 350° C. During the first stage, H$_2$S is injected at 100° C.

The flow rate of the gas mixture as well as the temperature rise slope are adjusted such that the amount of sulfur injected before the catalyst reaches the final sulfurization temperature corresponded to 130% of the sulfur stoichiometry that is necessary to the complete sulfurization of the catalyst. After sulfurization, the catalyst is cooled under the H$_2$S (13.5%)-H$_2$ (1.5%)-N$_2$ (85%) gas mixture to the ambient temperature. At ambient temperature, the unit is pressurized with pure hydrogen to the total pressure of the HDS test.

Example 7

H$_2$S—H$_2$—N$_2$ Sulfurization ex situ in a Fixed Bed at Atmospheric Pressure with an H$_2$S/H$_2$ Molar Ratio that is Equal to 9 Followed by an Oxidizing Passivation Stage (Catalyst C7 According to the Invention)

A sample of 40 cm$^3$ of oxide catalyst (31.8 g) is sulfurized ex situ in a reactor of the same technology as the one used in the HDS pilot unit, at atmospheric pressure, by a gas mixture with a composition of 85% by volume of nitrogen, 13.5% by volume of hydrogen sulfide (H$_2$S), and 1.5% by volume of hydrogen, or an H$_2$S/H$_2$ molar ratio that is equal to 9.

The sulfurization is carried out in two stages, whereby the first is a controlled temperature increase phase at 3° C./minute with an intermediate stage of 1 hour at 230° C., and the second is a 2-hour stage at the final sulfurization temperature of 350° C. During the first stage, the H$_2$S is injected at 100° C.

The flow rate of the gas mixture is adjusted such that the amount of injected sulfur before the catalyst reaches the final sulfurization temperature corresponded to 130% of the sulfur stoichiometry that is necessary to the complete sulfurization of the catalyst.

After sulfurization, the catalyst is cooled under the H$_2$S (13.5%)-H$_2$ (1.5%)-N$_2$ (85%) gas mixture up to 150° C., then under hydrogen to 80° C. At 80° C., after one hour of flushing under nitrogen, the catalyst is passivated by an O$_2$—N$_2$ oxidizing gas flow with increasing O$_2$ partial pressure. The O$_2$ partial pressure is increased by 1 kPa to 21.3 kPa by a stage of 2 kPa. The catalyst is kept below each oxidizing atmosphere stage until the exothermic effect disappears totally and the temperature returns to 80° C. At 21.3 kPa of O$_2$ and after the total disappearance of the exothermic effect, the catalyst is then cooled to the ambient temperature. The entire sample is then charged into the pilot unit for catalytic evaluation.

Example 8

Hydrodesulfurization Test of an SR Gas Oil

The C$_1$ and C$_2$ to C$_7$ oxide catalysts described above were compared as regards the hydrodesulfurization of a "straight-run" gas oil whose main characteristics are provided below:

| | |
|---|---|
| Density at 15° C.: | 0.8537 |
| Sulfur: | 1.35% by weight |

Simulated distillation:

| | |
|---|---|
| PI | 160° C. |
| 10% | 245° C. |
| 50% | 317° C. |
| 90% | 376° C. |
| PF | 404° C. |

The hydrodesulfurization test was conducted under the following operating conditions:

| | |
|---|---|
| H$_2$/HC ratio: | 400 l/l |
| Total pressure: | 7 MPa |
| Catalyst volume: | 40 cm$^3$ |
| Temperature: | 340° C. |
| Hydrogen flow rate: | 32 l/h |
| Feedstock flow rate: | 80 cm$^3$/h |
| Hourly volumetric flow rate: | 2 h$^{-1}$ |

A reference test is carried out by charging in the unit the NiMOP oxide catalyst of Example 1 (catalyst C1) and by initiating a sulfurization stage by passing the test feedstock defined above to which was added 2% by weight of dimethyl disulfide (DMDS) under the test conditions defined above except regarding the temperature, which is 350° C., whereby said temperature is maintained for 10 hours.

After this stage, the temperature is lowered to the test temperature, 340° C., and the pure gas oil feedstock is injected.

The catalytic performance levels of the tested catalysts are provided in the following table. They are expressed in terms of relative activity, by assuming that that of catalyst C1 is equal to 100 and by considering that they are on the order of 1.5. The equation linking the activity and the hydrodesulfurization conversion (% HDS) is as follows:

$$A_{HDS} = \frac{100}{[(100 - \%HDS)]} 0.5 - 1$$

TABLE 1

Activity of Catalysts in Gas Oil Hydrodesulfurization

| Catalyst | A$_{HDS}$ Relative to C1 |
|---|---|
| C1 | 100 |
| C2 For Comparison | 99 |
| C3 | 140 |
| C4 | 138 |
| C5 | 142 |

TABLE 1-continued

Activity of Catalysts in Gas Oil Hydrodesulfurization

| Catalyst | $A_{HDS}$ Relative to C1 |
|---|---|
| C6 | 137 |
| C7 | 143 |

Table 1 shows the significant increase in activity obtained in sulfurized catalysts according to the invention (C3, C4, C5, C6, C7) relative to the sulfurized catalyst under feedstock (C1) or to the sulfurized catalyst under $H_2S$—$H_2$ with an $H_2S/H_2$ volumetric ratio that is equal to 1 (C2).

Example 9

Sulfurization Levels

The sulfurization levels of sulfurized samples under sulfurization conditions recorded in Examples 2, 3, 4 and 7 are presented in Table 2. In the case of sulfurizations carried out under the conditions of Examples 2, 3 and 4, the samples have been transferred under nitrogen atmosphere for the analysis of the sulfur content. The sulfurization level is defined as the ratio between the experimental S/(Ni+Mo) molar ratios and the theoretical S/(Ni+Mo) molar ratios, multiplied by 100, whereby this theoretical ratio corresponds to the total transformation of molybdenum oxides $MoO_3$ and nickel oxides NiO into sulfides, respectively $MoS_2$ and $Ni_3S_2$.

TABLE 2

Sulfurization Levels

| Sulfurization Conditions | Sulfurization Levels (%) |
|---|---|
| C2 | 82 |
| C3 | 102 |
| C4 | 98 |
| C7 | 103 |

It is noted that the catalysts that are sulfurized according to the conditions of the invention (conditions of Examples 3, 4 and 7) exhibit sulfurization levels that are close to 100%, contrary to the catalysts that are sulfurized under conditions that are not in accordance with the invention (conditions of Example 2).

The entire disclosure of all applications, patents and publications, cited herein and of corresponding French application No. 04/09.544, filed Sep. 8, 2004 is incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for sulfurization of at least one hydrotreating catalyst comprising a stage of sulfurization in at least one sulfurization unit under a gas atmosphere that contains hydrogen sulfide ($H_2S$) and hydrogen ($H_2$), whereby said process is characterized in that the $H_2S/H_2$ molar ratio is greater than 4 and in that the $H_2S$ partial pressure is at least equal to 1 kPa.

2. A process according to claim 1, wherein the $H_2S/H_2$ molar ratio is more than 7.

3. A process according to claim 1, wherein the gas atmosphere contains a cover gas for dilution.

4. A process according to claim 1, wherein the sulfurization stage is carried out at a temperature of less than 600° C.

5. A process according to claim 4, wherein the sulfurization stage is carried out at a temperature of less than 500° C.

6. A process according to claim 1, wherein the sulfurization stage is carried out in situ.

7. A process according to claim 6, wherein the hydrogen sulfide is obtained from units for scrubbing refinery gases with amines, said gases coming from at least one unit for conducting any of hydrotreatment, thermal cracking, catalytic cracking and hydrocracking.

8. A process according to claim 7, wherein hydrogen sulfide comes from scrubbing gases from a hydrotreatment unit comprising the following stages:
Purging the hydrotreatment unit after charging by a cover gas, then by hydrogen, and pressurization of the hydrotreatment unit up to the nominal pressure of the hydrotreatment or up to the minimum pressure of operation of a recycling compressor;
Heating under hydrogen of a hydrotreatment charged catalyst in a catalytic bed up to a temperature of less than 200° C.;
Sulfurization stage:
Injection of $H_2S$ that is pure or mixed with a cover gas with a total gas flow rate of $H_2S$—$H_2$ or $H_2S$—$H_2$-cover gas, to charged catalyst calculated by volume between 1 and 10,000 liters of gas per liter of catalyst, measured under normal temperature and pressure conditions, and with a sulfurizing gas injection temperature of less than 200° C.;
Rise in temperature up to a final sulfurization temperature of more than 300° C. and less than 600° C., to a final sulfurization stage in one or more stages;
A holding stage at the final sulfurization temperature for a duration of less than 24 hours;
Cooling of the sulfurization unit under a sulfurizing atmosphere up to a temperature of less than 300° C.;
Halting of intake $H_2S$ that is pure or mixed with a cover gas, and, if necessary, bringing the unit to the pressure of the hydrotreatment process.

9. A process according to claim 8, wherein the rise in temperature between the temperature of injecting the sulfurizing gas and the final sulfurization temperature comprises an intermediate stage at a temperature of between 210 and 250° C.

10. A process according to claim 8, wherein the final sulfurization temperature is between 300 and 380° C.

11. A process according to claim 1, wherein the sulfurization stage is carried out ex situ.

12. A process according to claim 11, wherein the sulfurization stage is followed by an oxidizing passivation stage under an oxidizing gas flow that contains a partial pressure of oxygen of at most 21.3 kPa.

13. A process according to claim 11, wherein the hydrotreatment catalyst is in a fixed bed, a fluidized bed or a moving bed.

14. A Process according to claim 11 comprising the following stages:
Purging of the sulfurization unit after charging by a cover gas then by hydrogen and pressurization of the sulfurization unit, if necessary;

Heating under hydrogen of the hydrotreatment catalyst in a catalytic bed to a temperature of less than 200° C.;

Sulfurization stage:

Injection of $H_2S$ that is pure or mixed with a cover gas in the sulfurization unit with a total gas flow rate of $H_2H$—$H_2$ or $H_2S$—$H_2$-cover gas that is calculated by volume relative charged catalyst between 1 and 10,000 liters of gas per liter of catalyst, measured under the normal temperature and pressure conditions at a temperature of injecting sulfurizing gas of less than 200° C.;

Rise in temperature to a final sulfurization temperature of more than 300° C. and less than 600° C., to a final sulfurization stage in one or more stages;

A holding stage at the final sulfurization temperature for a duration of less than 24 hours;

Cooling of the sulfurization unit under sulfurizing atmosphere to a temperature of less than 300° C.;

Cooling under $H_2$ of the sulfurization unit to a temperature of less than 150° C.;

Purging under cover gas of the sulfurization unit to a temperature of less than 150° C. to eliminate $H_2S$ and $H_2$;

An oxidizing passivation stage: treatment of the hydrotreatment catalyst under an oxidizing gas flow having a partial pressure of oxygen of at most 21.3 kPa and at a temperature of less than 150° C. for a maximum period of 24 hours;

Cooling of the sulfurization unit to ambient temperature, depressurization if necessary and unloading of the hydrotreatment catalyst in ambient air.

15. A process according to claim 14, where in the oxidizing passivation stage the partial pressure of oxygen is increased from 1 kPa to at most 21.3 kPa in incremental respective stages of 2 to 4 kPa, and between each stage sufficient exothermal heat is released to decrease the temperature to that prior to the respective stage of oxidizing treatment.

16. A hydrotreatment catalyst subjected to a sulfurization treatment according to the process of claim 1.

17. In a catalytic process comprising conducting hydrorefining and/or hydroconversion/hydrocracking of hydrocarbon feedstocks, the improvement wherein the catalyst is according to claim 16.

18. A Hydrotreatment catalyst subjected to a sulfurization treatment according to the process of claim 2.

19. A Hydrotreatment catalyst subjected to a sulfurization treatment according to the process of claim 4.

20. A Hydrotreatment catalyst subjected to a sulfurization treatment according to the process of claim 8.

21. A Hydrotreatment catalyst subjected to a sulfurization treatment according to the process of claim 9.

22. A Hydrotreatment catalyst subjected to a sulfurization treatment according to the process of claim 10.

23. A Hydrotreatment catalyst subjected to a sulfurization treatment according to the process of claim 12.

24. A Hydrotreatment catalyst subjected to a sulfurization treatment according to the process of claim 14.

25. A Hydrotreatment catalyst subjected to a sulfurization treatment according to the process of claim 15.

26. In a catalytic process comprising conducting hydrorefining and/or hydroconversion/hydrocracking of hydrocarbon feedstocks, the improvement wherein the catalyst is according to claim 25.

\* \* \* \* \*